United States Patent
Zheng et al.

(10) Patent No.: US 12,444,171 B2
(45) Date of Patent: Oct. 14, 2025

(54) SYSTEMS AND METHODS FOR ANNOTATING 3D DATA

(71) Applicant: Shanghai United Imaging Intelligence Co., Ltd., Shanghai (CN)

(72) Inventors: Meng Zheng, Cambridge, MA (US); Srikrishna Karanam, Bangalore (IN); Ziyan Wu, Lexington, MA (US); Arun Innanje, Lexington, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 467 days.

(21) Appl. No.: 17/969,876

(22) Filed: Oct. 20, 2022

(65) Prior Publication Data

US 2024/0135684 A1    Apr. 25, 2024
US 2024/0233338 A9    Jul. 11, 2024

(51) Int. Cl.
| | |
|---|---|
| *G06V 10/774* | (2022.01) |
| *G06T 7/00* | (2017.01) |
| *G06V 10/22* | (2022.01) |
| *G06V 20/70* | (2022.01) |

(52) U.S. Cl.
CPC .......... *G06V 10/774* (2022.01); *G06T 7/0012* (2013.01); *G06V 10/235* (2022.01); *G06V 20/70* (2022.01); *G06T 2207/20081* (2013.01); *G06T 2207/20108* (2013.01)

(58) Field of Classification Search
None
See application file for complete search history.

(56) References Cited

U.S. PATENT DOCUMENTS

| | | | |
|---|---|---|---|
| 8,126,244 B2 | 2/2012 | Lu et al. | |
| 8,554,307 B2 | 10/2013 | Razzaque et al. | |
| 11,783,936 B2* | 10/2023 | Harte | G16H 15/00 705/2 |
| 2014/0152648 A1 | 6/2014 | Sandrew et al. | |
| 2018/0082487 A1* | 3/2018 | Kiraly | G06T 19/20 |
| 2020/0219609 A1* | 7/2020 | Harte | G16H 50/20 |
| 2020/0268339 A1* | 8/2020 | Hao | A61B 6/544 |
| 2020/0327661 A1* | 10/2020 | Oved | G16H 30/20 |
| 2021/0081822 A1* | 3/2021 | Davidson | G06V 10/945 |
| 2021/0142550 A1* | 5/2021 | Sutton | G06T 15/08 |

(Continued)

FOREIGN PATENT DOCUMENTS

| | | |
|---|---|---|
| CA | 2688339 A1 | 12/2008 |
| WO | 2009091559 A1 | 7/2009 |

*Primary Examiner* — Tsung Yin Tsai
(74) *Attorney, Agent, or Firm* — Zhong Law, LLC

(57) ABSTRACT

Described herein are systems, methods, and instrumentalities associated with automatically annotating a 3D image dataset. The 3D automatic annotation may be accomplished based on a 2D annotation provided by an annotator and by propagating the 2D annotation through multiple images of a sequence of 2D images associated with the 3D image dataset. The automatically annotated 3D image dataset may then be used to annotate other 3D image datasets based on similarities between the first 3D image dataset and the other 3D image datasets. The automatic annotation of the first 3D image dataset and/or the other 3D image datasets may be conducted based on one or more machine-learning models trained for performing those tasks.

15 Claims, 8 Drawing Sheets

(56) References Cited

U.S. PATENT DOCUMENTS

| | | | |
|---|---|---|---|
| 2022/0188566 A1* | 6/2022 | Ge | G06F 18/2178 |
| 2023/0016464 A1* | 1/2023 | OConnor | G06N 20/00 |
| 2023/0245433 A1* | 8/2023 | He | G06V 10/82 |
| 2024/0020914 A1* | 1/2024 | Leroux | G06T 19/00 |

\* cited by examiner

SYSTEMS AND METHODS FOR ANNOTATING 3D DATA

BACKGROUND

Having annotated data is crucial to the training of machine-learning (ML) models or artificial neural networks. Current data annotation relies heavily on manual work by qualified annotators (e.g., professional radiologists if the data includes medical images), and even when computer-based tools are provided, they still require a tremendous amount of human effort (e.g., mouse clicking, drag-and-drop, etc.). This strains resources and often leads to inadequate and/or inaccurate results. Accordingly, it is highly desirable to develop systems and methods to automate the data annotation process such that more data may be obtained for ML training and/or verification.

SUMMARY

Described herein are systems, methods, and instrumentalities associated with automatic 3D data (e.g., 3D images) annotation. An apparatus capable of performing the automatic annotation task may include at least one processor that may be configured to obtain a first sequence of two-dimensional (2D) images associated with a first three-dimensional (3D) image dataset (e.g., medical images of a first patient), receive an annotation associated with a first 2D image in the first sequence of 2D images, and generate a 3D annotation for the first 3D image dataset based at least on the annotation associated with the first 2D image. The 3D annotation may be generated, for example, by automatically annotating multiple other 2D images of the first sequence of 2D images based on the annotation associated with the first 2D image and a first machine-learned (ML) data annotation model. In examples, the first sequence of 2D images may be obtained by splitting the 3D image dataset along an axis of the dataset, and the annotation associated with the first 2D image may be created from a user of the apparatus (e.g., a human annotator), e.g., using a user interface provided by the apparatus. The annotation may indicate (e.g., delineate or segment) an object of interest in the first 2D image and the first ML data annotation model may be trained for detecting features associated with the object of interest in the multiple other 2D images of the first sequence of 2D images and automatically annotating the multiple other 2D images based on the detected features. The 3D annotation for the first 3D image dataset may be generated further based on a user input that modifies the 3D annotation, and the user input may be used to adjust (e.g., improve) the parameters of the first ML data annotation model.

In examples, the apparatus described herein may be further configured to obtain a second 3D image dataset (e.g., medical images of a second patient) and generate a 3D annotation for the second 3D image dataset based on the 3D annotation of the first 3D dataset. For example, the apparatus may be configured to obtain a second sequence of 2D images along an axis of the second 3D image dataset, identify a second 2D image in the second sequence of 2D images based on a similarity between the first 3D image dataset and the second 3D image dataset, automatically annotate the second 2D image based on the annotation associated with the first 2D image, and generate the 3D annotation for the second 3D image dataset by automatically annotating multiple other 2D images of the second sequence of 2D images based at least on the automatically annotated second 2D image and the first ML data annotation model. In examples, the apparatus may be further configured to receive a user input that modifies the automatic annotation of the second 2D image and generate the 3D annotation for the second 3D image dataset further based on the user input. In examples, the identification and/or initial annotation of the second 2D image may be conducted based on a second ML data annotation model, which may be trained for determining the similarity between the first 3D image dataset and the second 3D image dataset, and for generating the initial annotation for the second 3D image dataset.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1:
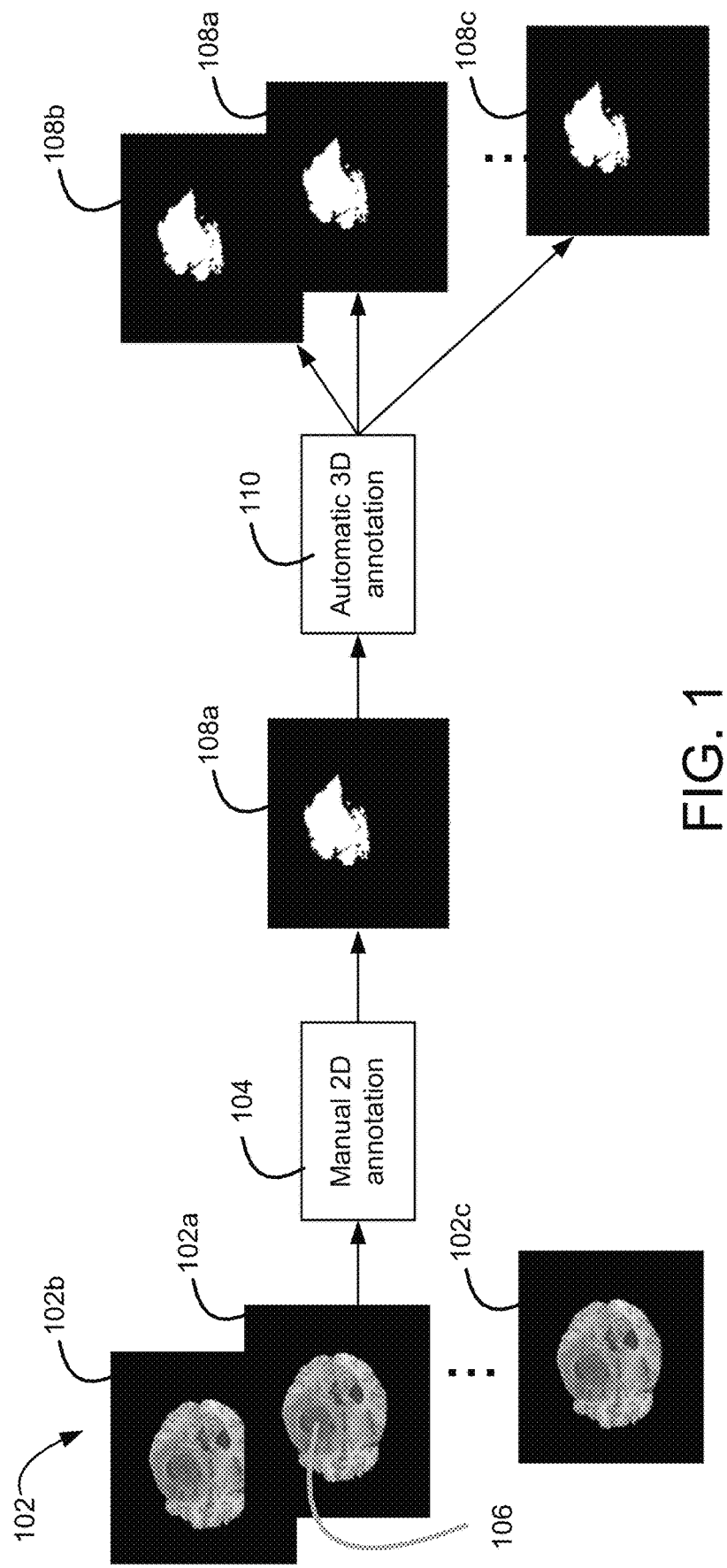
FIG. 1 is a diagram illustrating an example of automatic 3D data annotation, in accordance with one or more embodiments of the present disclosure.

FIG. 1 illustrates an example of automatic 3D data annotation in accordance with one or more embodiments of the present disclosure. The example will be described in the context of medical images such as magnetic resonance imaging (MRI) images, computed tomography (CT) images, and/or X-ray images, but those skilled in the art will appreciate that the disclosed techniques may also be used to annotate other types of images or data including, for example, red-green-blue (RBG) images, depth images, thermal images, alphanumeric data, etc. As shown in FIG. 1, a first 3D image dataset requiring annotation may include a first sequence of 2D images 102, which may be obtained by splitting the 3D image dataset along a direction (e.g., axis) of the 3D image dataset. For instance, the first 3D image dataset may include MRI or CT scans of a first patient captured along one or more axes of an anatomical structure of the patient (e.g., from top to down, from front to back, etc.), and the first sequence of 2D images 102 may be obtained by splitting the first 3D image dataset along one of those axes.

In some embodiments of the present disclosure, a computer-generated user interface (not shown) may be provided to display the first sequence of 2D images 102 (e.g., after they have been obtained using the technique described above), and a user may, through the interface, select and annotate one or more of the first sequence of 2D images 102. For example, the user may select an image 102a from the first sequence of 2D images 102 and annotate, at 104, the image 102a by marking, outlining, or otherwise indicating the location or contour of an object of interest 106 (e.g., a brain hemorrhage) in the image 102a to obtain an annotation 108 (e.g., a segmentation mask) for the original image 102a. The annotation operation at 104 may be performed using tools provided by the user interface, which may allow the user to create the annotation 108 through one or more of a click, a tap, a drag-and-drop, a click-drag-and-release, a sketching or drawing motion, etc. that may be executed by the user with an input device (e.g., a computer mouse, a keyboard, a stylus, a touch screen, the user's finger, etc.). The annotation 108 may then be used at 110 to generate a 3D annotation for the first 3D image dataset, for example, by propagating the annotation 108 through (e.g., by automatically annotating) multiple other images 102b, 102c, etc. of the first sequence 102 (e.g., annotation 108 may be propagated to all or a subset of the first sequence of 2D images 102) to obtain annotations (e.g., segmentation masks) 108b, 108c, etc. The automatic 3D annotation at 110 may be accomplished using a first machine-learning (ML) data annotation model, which may be trained for detecting features associated with the object of interest 106 in image 102a (e.g., based on manual annotation provided at 104), identifying areas having similar features from the other 2D images (e.g., 102b, 102c, etc.) of the first sequence 102, and automatically annotating those areas as containing the object of interest 106. The implementation and/or training of the first ML data annotation model will be described in greater detail below, and the term "machine-learning model" may be used interchangeably herein with the term "machine-learned model" or "artificial intelligence model."

The 3D annotation generated at 110 for the first 3D image dataset may be displayed to a user (e.g., the same user who created the 2D annotation 108), who may then confirm and/or adjust the 3D annotation (e.g., through one or more user inputs), for example, using the same user interface described above. The confirmed and/or adjusted 3D annotation may be used to automatically annotate (e.g., generate a 3D annotation for) other 3D image datasets such as a second 3D image dataset that may be associated with a second patient, as described below. The user-provided adjustment may also be used to improve the first ML data annotation model, for example, through reinforcement learning, which may be conducted (e.g., in an online manner) after the first ML data annotation model has been trained (e.g., in an offline manner) and deployed. The improvement may be accomplished, for example, based on the differences (e.g., prediction errors) between the automatic annotation predicted by the first ML data annotation model and the user input.

Figure 2:
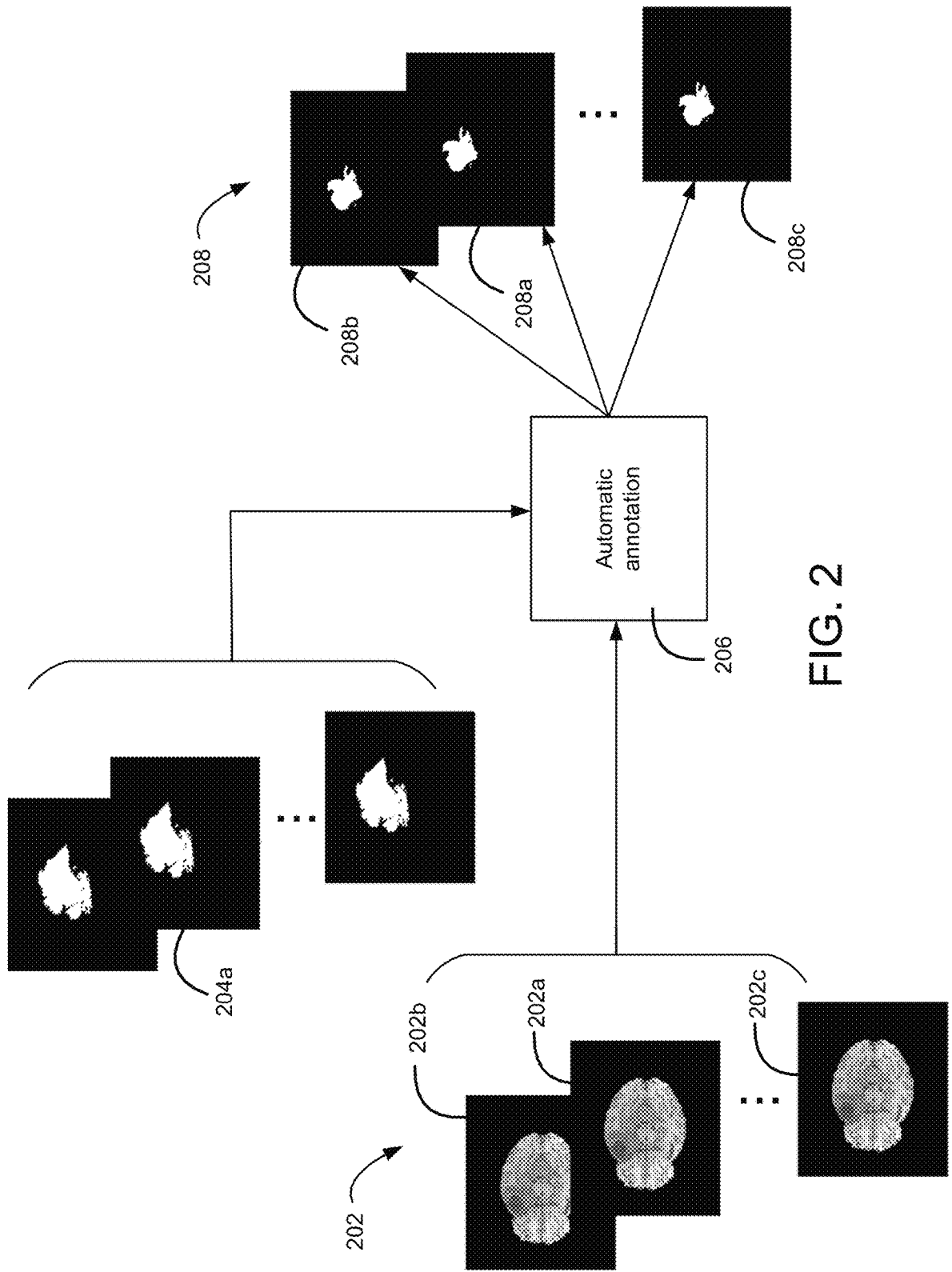
FIG. 2 is a diagram illustrating example techniques for automatically annotating a second 3D image dataset based on an annotated first 3D image dataset, in accordance with one or more embodiments of the present disclosure.

FIG. 2 illustrates an example of automatically annotating a second 3D image dataset based on an annotated first 3D image dataset such as the 3D image dataset 102 of FIG. 1. Similar to the first 3D image dataset 102, the second 3D image dataset may include a second sequence of 2D images 202, which may be obtained by splitting the second 3D image dataset along a direction (e.g., axis) of the second 3D image dataset. For instance, the 3D image dataset may include MRI or CT scans of the second patient captured along one or more axes of an anatomical structure (e.g., the same anatomical structure in the first 3D image dataset) of the patient (e.g., from top to down, from front to back, etc.), and the second sequence of 2D images 202 may be obtained by splitting the second 3D image dataset along one of those axes (e.g., along the same axis from which the first 3D image dataset is obtained).

To annotate the second 3D image dataset based on the first 3D image dataset such as a previously annotated sequence of 2D images (e.g., the first sequence 102 of FIG. 1), one or more images 202a of the second sequence of 2D images 202 may be automatically selected, for example, based on similarities between the image(s) 202a and one or more images of the previously annotated sequence (e.g., an image 202a from the second sequence 202 may be selected for being similar to one of the images in the previously annotated sequence). Once the similar image(s) from the second sequence 202 are selected, initial annotation(s) (e.g., 2D annotation(s)) may be automatically generated (e.g., as part of the operation at 206) based on the similarity between the selected image(s) from sequence 202 and the corresponding image(s) in the previously annotated sequence, and the annotation(s) (e.g., segmentation mask 204a, etc.) that have been generated for the corresponding image(s). One or more of these tasks may be accomplished using a second ML data annotation model, which may be trained for identifying similar images from the second sequence 202 and the annotated sequence 204, and generating the initial annotation(s) for the second sequence 202, as described above. The implementation and training of the second ML data annotation model will be described in greater detail below.

The automatically generated initial 2D annotation(s) for the second sequence 202 may be confirmed and/or adjusted by a user, for example, using the user interface described herein. The confirmed or adjusted 2D annotation may then be propagated (e.g., from image 202a) to other images (e.g., 202b, 202c, etc.) of the second sequence 202 (e.g., to all or a subset of the second sequence of 2D images 202) to obtain a 3D annotation 208 for the second 3D image dataset (e.g., comprising segmentation masks 208a, 208b, 208c, etc.). The propagation (e.g., the automatic annotation of images 202b, 202c, etc.) may be accomplished, for example, based on the first ML data annotation model described herein. The user-confirmed or adjusted annotation(s) may also be used for improving the second ML data annotation model, for example, to generate more accurate initial annotation(s) for subsequent 3D image datasets.

Figure 3:
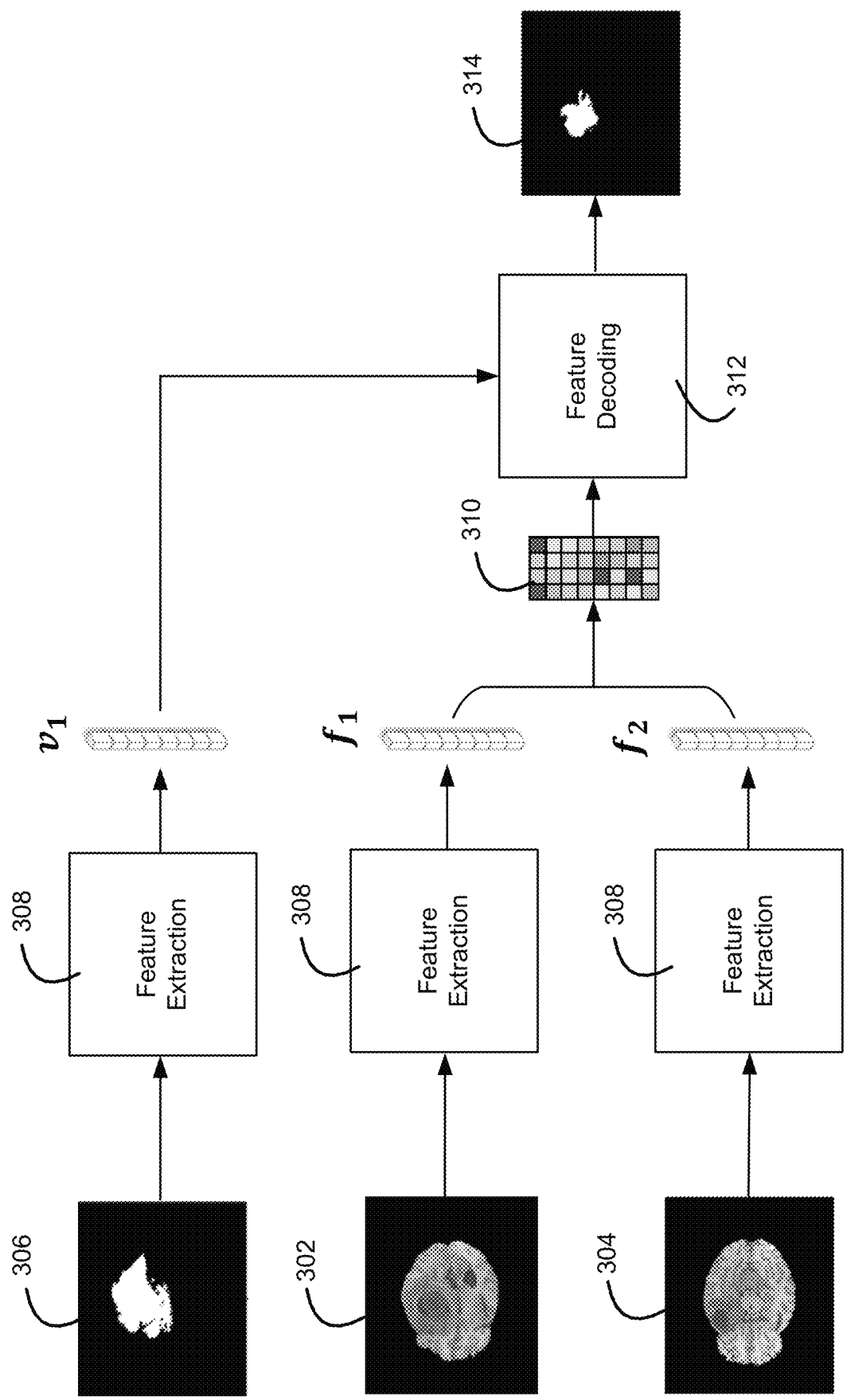
FIG. 3 is a diagram illustrating examples machine learning techniques for automatically annotating a second image based on an annotated first image, in accordance with one or more embodiments of the present disclosure.

FIG. 3 illustrates an example of an ML model (e.g., the first ML data annotation described herein) for automatically annotating a second image 304 of an object based on a first image 302 of the object and an annotation (e.g., a segmentation mask) 306 already generated for the first image 302. As shown, the ML model may include one or more features extraction modules 308 configured to extract features, $f_1$, $f_2$, $v_1$ from the first image 302, the second image 304, and the annotation (e.g., segmentation mask) 306, respectively. The feature extraction module 308 may be implemented using an artificial neural network such as a convolutional neural network (CNN). In examples, such a CNN may include an input layer configured to receive an input image (e.g., including a segmentation mask) and one or more convolutional layers, pooling layers, and/or fully-connected layers configured to process the input image. Each of the convolutional layers may include a plurality of convolution kernels or filters with respective weights, the values of which may be learned through a training process such that features associated with an object of interest in the image may be identified using the convolution kernels or filters upon completion of the training. The convolutional layers may be followed by batch normalization and/or linear or non-linear activation (e.g., such as a rectified linear unit (ReLU) activation function), and the features extracted through the convolution operations may be down-sampled through one or more pooling layers to obtain a representation of the features, for example, in the form of a feature vector or a feature map (e.g., feature representation $f_1$, $f_2$, or $v_1$).

In some implementations of the ML model shown in FIG. 3, the same feature extraction module may be used to encode the features from the first image 302, the second image 304, and the segmentation mask 306. In other implementations, different feature extraction modules may be used to encode the features from the images. For example, a key encoder may be used to encode features $f_1$ and $f_2$ from the first image 302 and the second image 304, respectively, and a value encoder may be used to encode features $v_1$ from the segmentation mask 306. In examples, image features $f_1$ and $f_2$ may be used to derive (e.g., calculate or learn) an affinity matrix 310 that may represent the spatial-temporal correspondence between the first image 302 and the second image 304. The affinity matrix 310 and the features $v_1$ of the segmentation mask 306 may then be used to decode (e.g., at 312) a segmentation mask 314 for the second image 304. The feature decoding at 312 may be conducted using a CNN that may include one or more un-pooling layers and one or more transposed convolutional layers. Through the un-pooling layers, the features provided by the affinity matrix 310 and/or features $v_1$ of the segmentation mask 306 may be up-sampled, and the up-sampled features may be further processed through the one or more transposed convolutional layers (e.g., via a plurality of deconvolution operations) to derive an up-scaled or dense feature map or feature vector. The dense feature map or vector may then be used to predict areas (e.g., pixels) in the second image 304 that may belong to object of interest. The prediction may be represented by the segmentation mask 314, which may include a respective probability value (e.g., ranging from 0 to 1) for each image pixel indicating whether the image pixel belongs to the object of interest (e.g., having a probability value above a preconfigured threshold) or a background area (e.g., having a probability value below a preconfigured threshold).

Figure 4:
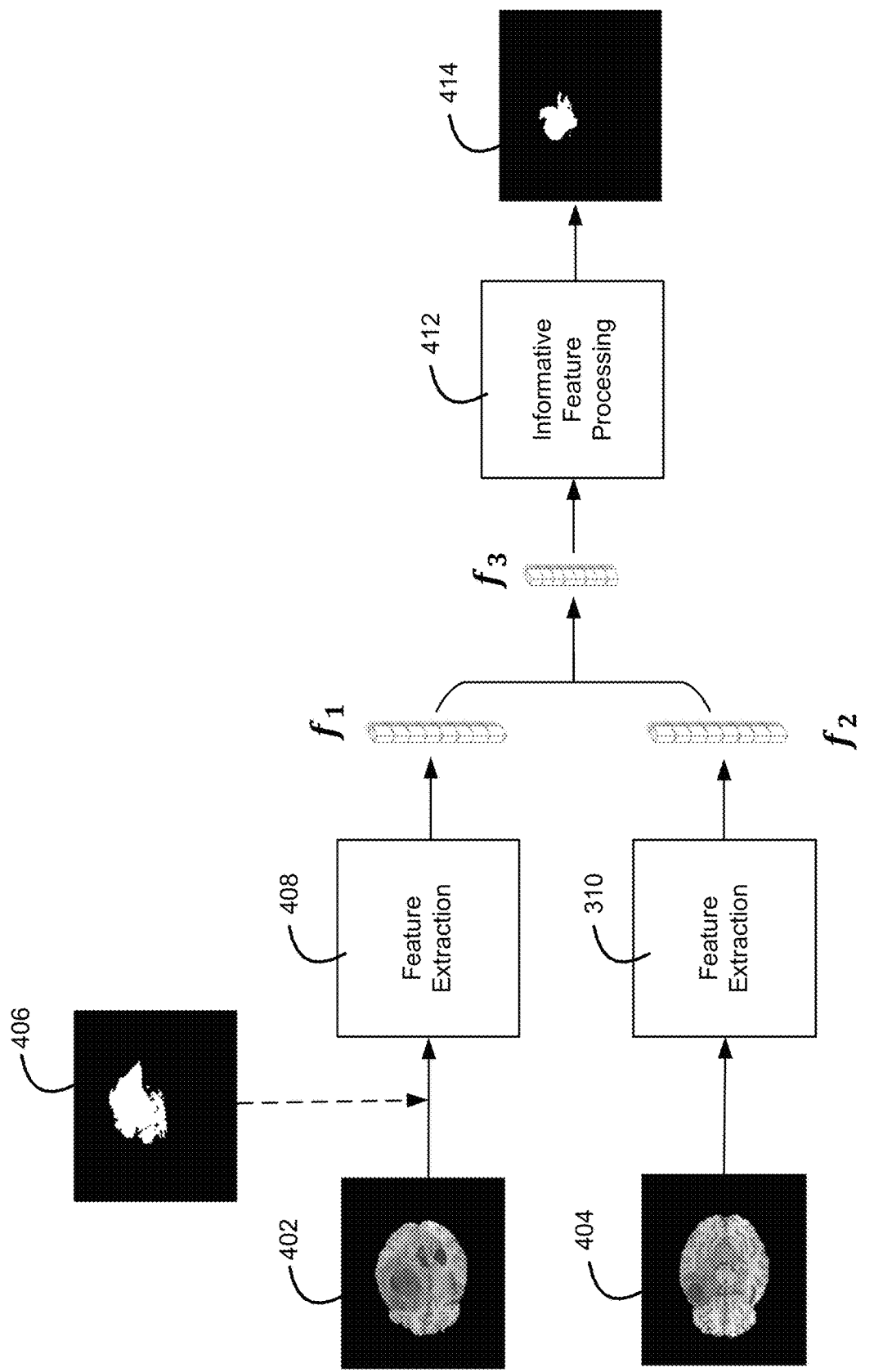
FIG. 4 is a diagram illustrating examples machine learning techniques for generating an initial annotation for a second 3D image dataset based on an annotated first image dataset, in accordance with one or more embodiments of the present disclosure.

FIG. 4 illustrates an example of an ML model (e.g., the second ML data annotation model described herein) for automatically annotating a second image 404 (e.g., an image from sequence 202 of FIG. 2) of an object based on a first image 402 of the object and an annotation 406 for the first image 402. The first image 402 may be an image from a previously annotated sequence (e.g., image 102a of FIG. 1) and the annotation 406 (e.g., annotation 108a of FIG. 1) may be manually generated (e.g., with human interventions), for example, with the user interface and/or tools described herein. Based on the first image 402 and the annotation 406 (e.g., which may be a segmentation mask), a first plurality of features, $f_1$, associated with the annotated object of interest may be extracted from the first image 402 and/or the annotation 406 using an extraction module 408. The extraction module may be learned and/or implemented using an artificial neural network such as a convolutional neural network (CNN). In examples, such a CNN may include an input layer configured to receive an input image and one or more convolutional layers, pooling layers, and/or fully-connected layers configured to process the input image. Each of the convolutional layers may include a plurality of convolution kernels or filters with respective weights, the values of which may be learned through a training process such that features associated with an object of interest in the image may be identified using the convolution kernels or filters upon completion of the training. The convolutional layers may be followed by batch normalization and/or linear or non-linear activation (e.g., such as a rectified linear unit or ReLU activation function), and the features extracted through the convolution operations may be down-sampled through one or more pooling layers to obtain a representation of the features, for example, in the form of a feature vector or a feature map. In some examples (e.g., if a segmentation mask for the input image is to be generated), the CNN may also include one or more un-pooling layers and one or more transposed convolutional layers. Through the un-pooling layers, the network may up-sample the features extracted from the input image and process the up-sampled features through the one or more transposed convolutional layers (e.g., via a plurality of deconvolution operations) to derive an up-scaled or dense feature map or feature vector. The dense feature map or vector may then be used to predict areas (e.g., pixels) in the input image that may belong to object of interest. The prediction may be represented by a mask, which may include a respective probability value (e.g., ranging from 0 to 1) for each image pixel that indicates whether the image pixel may belong to object of interest (e.g., having a probability value above a preconfigured threshold) or a background area (e.g., having a probability value below a preconfigured threshold).

The annotation 406 for the first image 402 may be used to enhance the completeness and/or accuracy of the first plurality of features $f_1$ (e.g., which may be obtained as a feature vector or feature map). For example, using a normalized version of the annotation 406 (e.g., by converting probability values in the annotation mask to a value range between 0 and 1), the first image 402 (e.g., pixel values of the first image 402) may be weighted (e.g., before the weighted imagery data is passed to the feature extraction operation at 408) such that pixels belonging to the object of interest may be given larger weights during the feature extraction process. As another example, the normalized annotation mask may be used to apply respective weights to the features (e.g., preliminary features) extracted at 408 such that features associated with the object of interest may be given larger weights within the feature representation $f_1$.

The second image 404, which may include the same object of interest as the first image 402, may be processed through a feature extraction module 410 (e.g., which may be the same feature extraction module as 408 or a difference feature extraction module) to determine a second plurality of features $f_2$. The second plurality of features $f_2$ may be represented in the same format as the first plurality of features $f_1$, (e.g., as a feature vector) and/or may have the same size as $f_1$. The two sets of features may be used jointly to determine a set of informative features $f_3$ that may be indicative of the pixel characteristics of the object of interest in first image 402 and the second image 404. For instance, informative features $f_3$ may be obtained by comparing features $f_1$ and $f_2$, and selecting the features that are common to both $f_1$ and $f_2$. One example way of accomplishing this task may be to normalize the feature vectors of $f_1$ and $f_2$ (e.g., such that both vectors have values ranging from 0 to 1), compare the two normalized vectors (e.g., based on ($f_1$-$f_2$)), and select corresponding elements in the two vectors that have a value difference smaller than a predefined threshold as the informative features $f_3$.

In examples, the second plurality of features $f_2$ extracted from the second image 404 and/or the informative features $f_3$ may be further processed at 412 to gather information (e.g., from certain dimensions of $f_2$) that may be used to automatically annotate the object of interest in the second image 404. For example, based on the informative features $f_3$, an indicator vector having the same size as the feature vector $f_1$ and/or $f_2$ may be derived in which elements that correspond to informative features $f_3$ may be given a value of 1 and the remaining elements may be given a value of 0. A score may then be calculated to aggregate of the informative features $f_3$ and/or the informative elements of feature vector $f_2$. Such a score may be calculated, for example, by conducting an element-wise multiplication of the indicator vector and feature vector $f_2$. Using the calculated score, an annotation 414 of the object of interest may be automatically generated for the second image 404, for example, by backpropagating a gradient of the score through the first ML data annotation model (e.g., through the neural network used to implement the first ML data annotation model) and determining pixel locations (e.g., spatial dimensions) that may correspond to the object of interest based on the gradient values associated with the pixel locations. For instance, pixel locations having positive gradient values during the backpropagation (e.g., these pixel locations may make positive contributions to the desired result) may be determined to be associated with the object of interest and pixel locations having negative gradient values during the backpropagation (e.g., these pixel locations may not make contributions or may make negative contributions to the desired result) may be determined to be not associated with the object of interest. Annotation 414 for the second image 404 may then be generated based on a weighted linear combination of the feature maps or feature vectors obtained by the first ML data annotation model (e.g., the gradients may operate as the weights in the linear combination).

The annotation (e.g., annotation 414) automatically generated using the techniques described above may be presented to a user, for example, through the user interface described herein so that adjustments may be made by the user to refine the annotation. For example, the user interface may allow the user to adjust the annotation 414 by executing one or more of a click, a tap, a drag-and-drop, a click-drag-and-release, a sketching or drawing motion, etc. Adjustable control points may be provided along the contour of the annotation 414 and the user may be able to change the shape of the annotation 414 by manipulating one or more of these control points (e.g., by dragging and dropping the control points to various new locations on the display screen).

Figure 5:
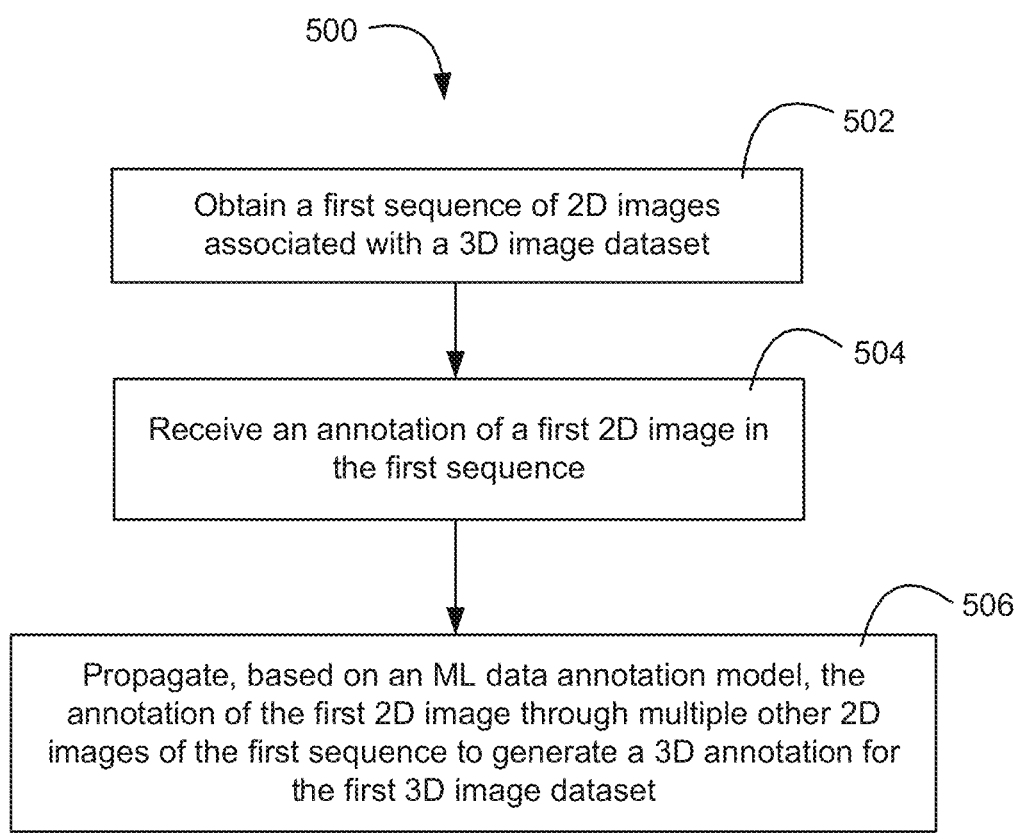
FIG. 5 is a flow diagram illustrating example operations that may be associated with automatically annotating a 3D image dataset, in accordance with one or more embodiments of the present disclosure.

FIG. 5 illustrates example operations 500 that may be associated with the automatic annotation of a 3D image dataset. As shown, the operations 500 may include obtaining, at 502, a first sequence of 2D images associated with a first 3D image dataset. The first sequence of 2D images may be obtained, for example, by splitting the 3D image dataset along an axis of the 3D image dataset and including the 2D images associated with the axis in the first sequence. The operations 500 may further include receiving, at 504, an annotation of a first 2D image in the first sequence of 2D images, where the annotation may be created by an annotator using the user interface and/or annotation tools described herein. Based on the received annotation of the first 2D image, a 3D annotation may be generated for the first 3D image dataset based on a ML data annotation model, for example, by propagating the annotation of the first 2D image to multiple other 2D images of the first sequence of 2D images. The annotation of the first 2D image may indicate (e.g., delineate or segment) an object of interest in the first 2D image, and the first ML data annotation model may be trained for detecting features associated with the object of interest in the other 2D images of the first sequence and automatically annotating the other 2D images based on the detected features.

The automatically generated 3D annotation for the first 3D image dataset may be confirmed and/or adjusted by a user, and the parameters of the first ML model may be adjusted based on the user adjustment, for example, through reinforcement learning (e.g., conducted in an online manner). The confirmed or adjusted 3D annotation may be used to automatically annotate other 3D image datasets including, e.g., a second 3D image dataset associated with a second patient.

Figure 6:
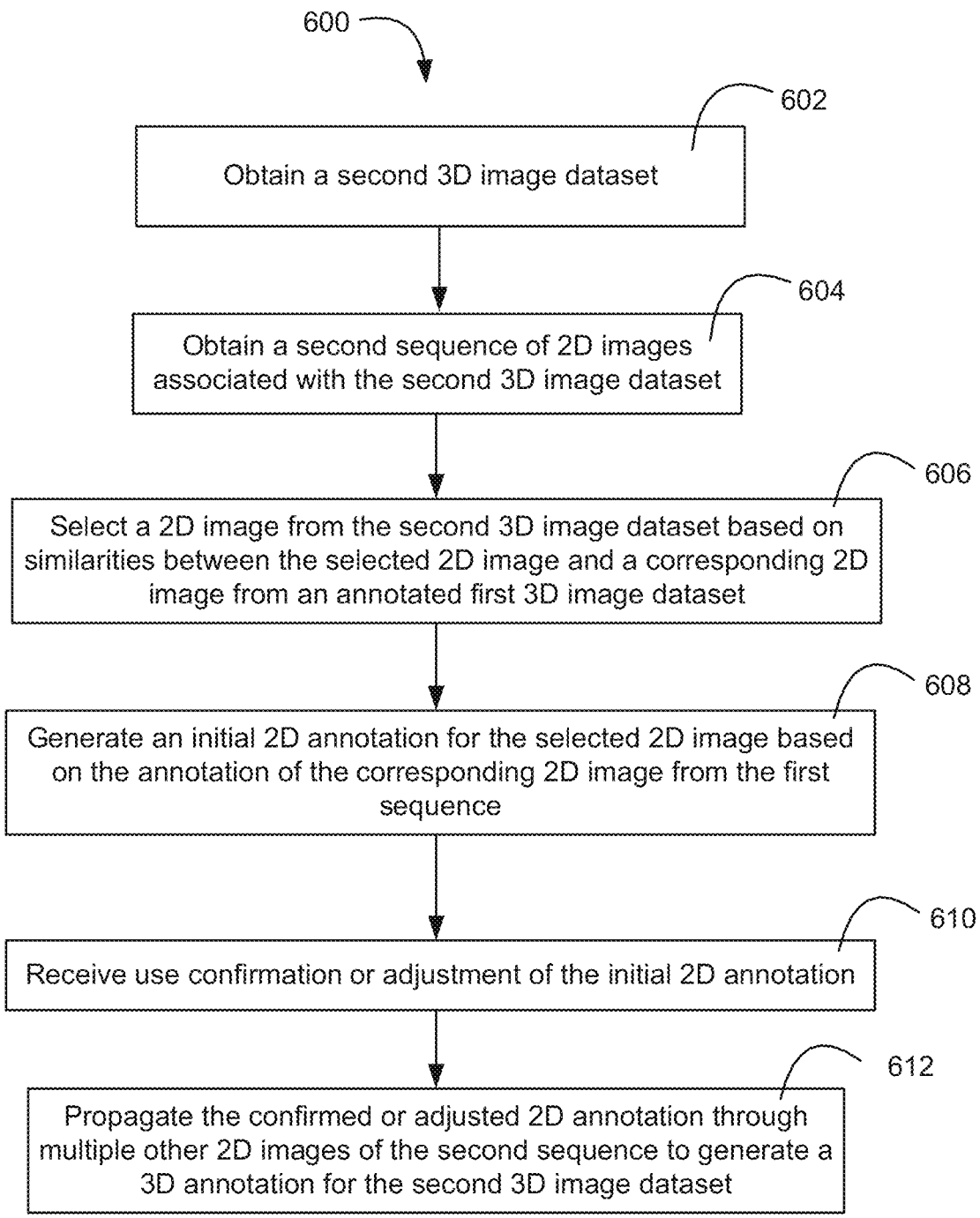
FIG. 6 is a flow diagram illustrating example operations that may be associated with automatically annotating a second 3D image dataset based on an annotated first 3D image dataset, in accordance with one or more embodiments of the present disclosure.

FIG. 6 illustrates example operations 600 that may be associated with the automatic annotation of a second 3D image dataset based on an annotated first 3D image dataset. As shown, the operations 600 may include obtaining, at 602, the second 3D image dataset and splitting the second 3D image dataset (e.g., along an axis of the second 3D image dataset) to obtain a second sequence of 2D images at 604. From the second sequence of 2D images, a 2D image may be selected at 606 based on a similarity between the 2D image and a corresponding 2D image in the annotated first 3D image dataset. An initial 2D annotation may then be automatically generated for the 2D image in the second sequence at 608 based on the annotation of the corresponding 2D image in the first 3D image dataset. The initial 2D annotation may be confirmed or adjusted (e.g., by a human annotator) at 610 before the confirmed or adjusted 2D annotation is used to generate a 3D annotation for the second 3D image dataset at 612, e.g., by propagating the confirmed or adjusted 2D annotation through multiple other 2D images of the second sequence of 2D images based on the first ML data annotation model described herein.

Figure 7:
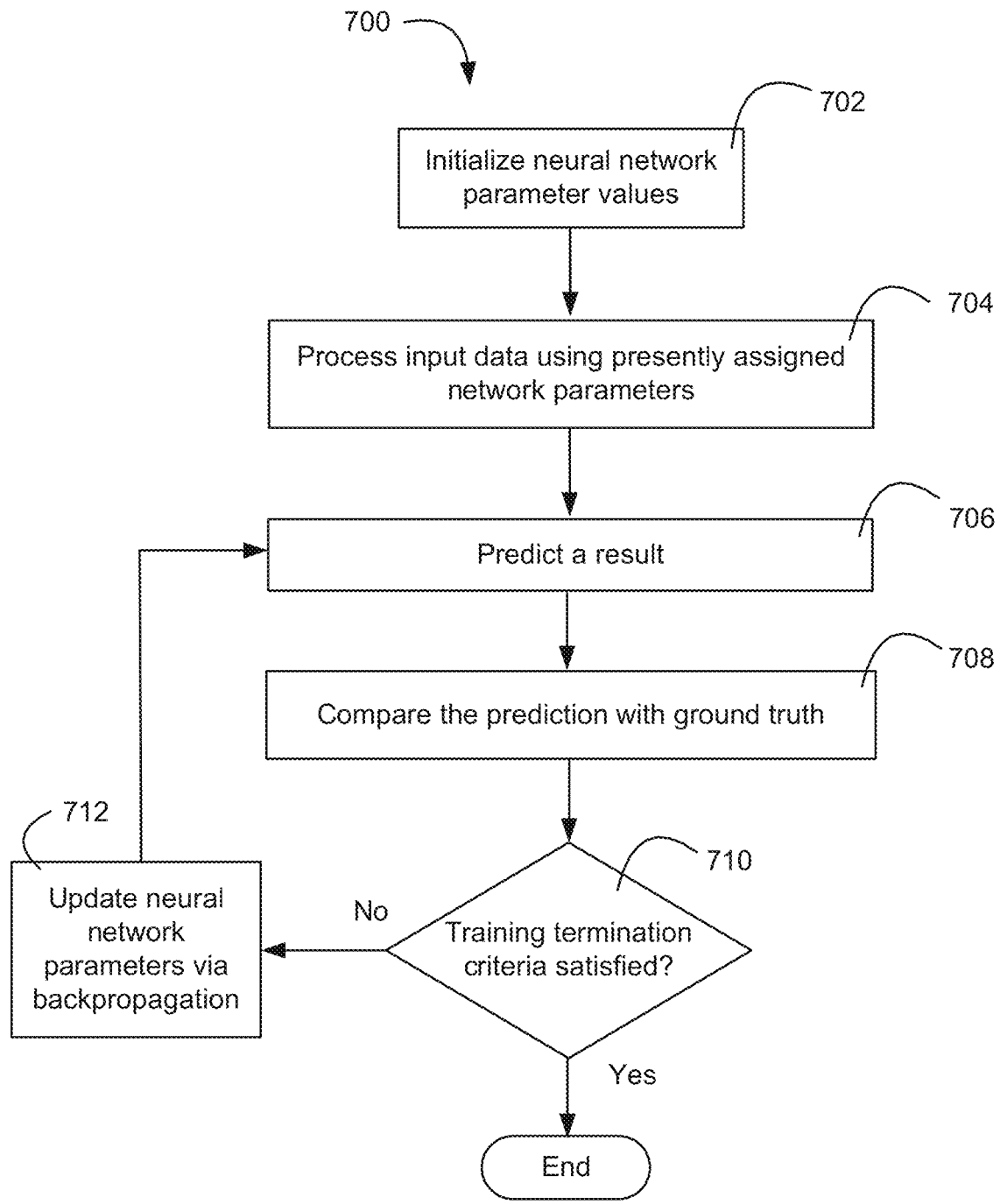
FIG. 7 is a flow diagram illustrating example operations that may be associated with training a neural network to perform the tasks described in accordance with one or more embodiments of the present disclosure.

FIG. 7 illustrates example operations 700 that may be associated with training a neural network (e.g., a neural network used to implement the first and/or second ML data annotation models described herein) to perform one or more of the tasks described herein. As shown, the training operations 700 may include initializing the operating parameters of the neural network (e.g., weights associated with various layers of the neural network) at 702, for example, by sampling from a probability distribution or by copying the parameters of another neural network having a similar structure. The training operations 700 may further include processing an input (e.g., a training image) using presently assigned parameters of the neural network at 704, and making a prediction for a desired result (e.g., an estimated annotation) at 706. The prediction result may be compared to a ground truth at 708 to determine a loss associated with the prediction, for example, based on a loss function such as mean squared errors between the prediction result and the ground truth, an L1 norm, an L2 norm, etc. At 710, the loss may be used to determine whether one or more training termination criteria are satisfied. For example, the training termination criteria may be determined to be satisfied if the loss is below a threshold value or if the change in the loss between two training iterations falls below a threshold value. If the determination at 710 is that the termination criteria are satisfied, the training may end; otherwise, the presently assigned network parameters may be adjusted at 712, for example, by backpropagating a gradient descent of the loss function through the network before the training returns to 706.

For simplicity of explanation, the training operations are depicted and described herein with a specific order. It should be appreciated, however, that the training operations may occur in various orders, concurrently, and/or with other operations not presented or described herein. Furthermore, it should be noted that not all operations that may be included in the training method are depicted and described herein, and not all illustrated operations are required to be performed.

Figure 8:
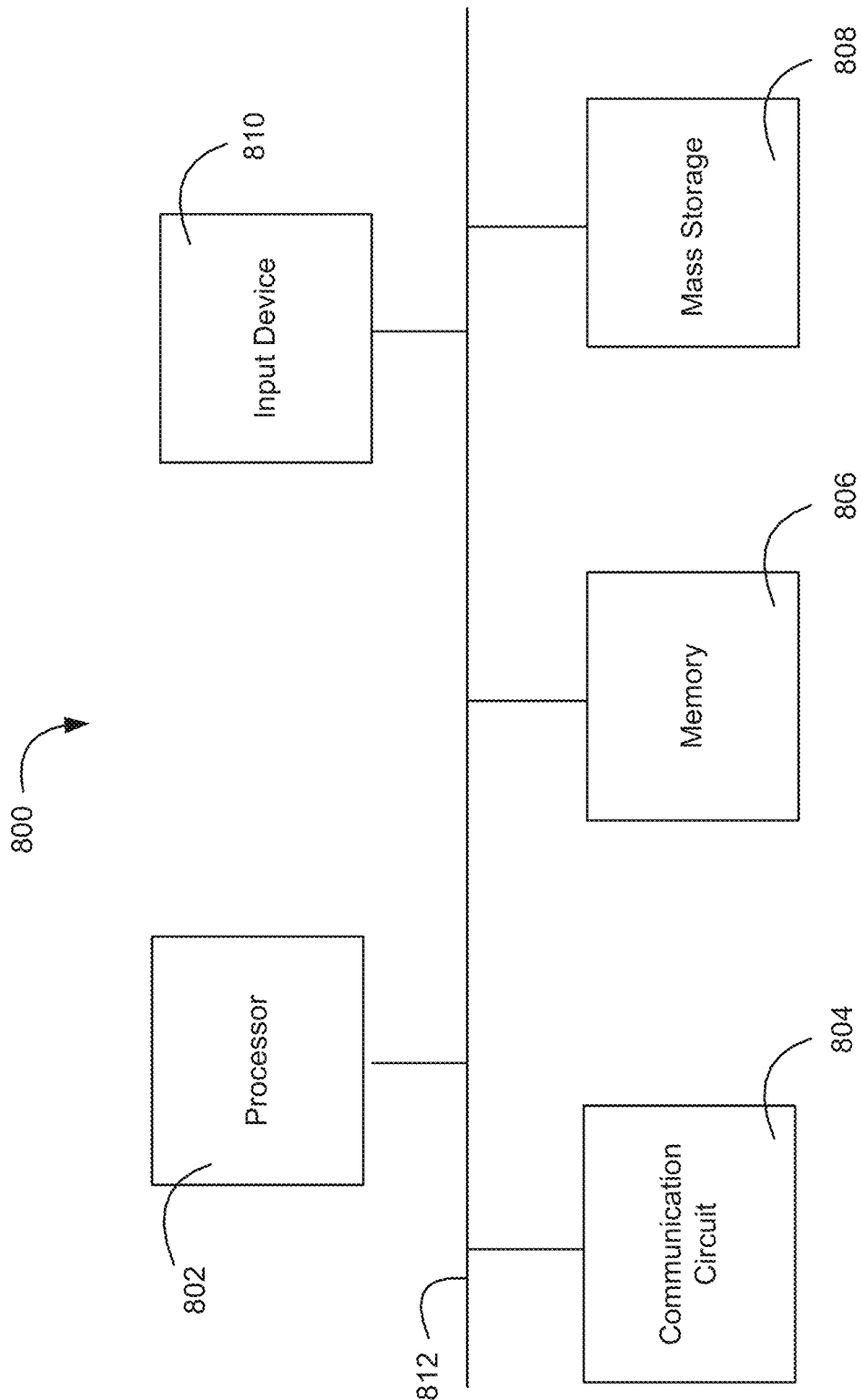
FIG. 8 is a block diagram illustrating example components of an apparatus that may be configured to perform the tasks described in accordance with one or more embodiments of the present disclosure.

The systems, methods, and/or instrumentalities described herein may be implemented using one or more processors, one or more storage devices, and/or other suitable accessory devices such as display devices, communication devices, input/output devices, etc. FIG. 8 is a block diagram illustrating an example apparatus 800 that may be configured to perform the automatic image annotation tasks described herein. As shown, apparatus 800 may include a processor (e.g., one or more processors) 802, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 800 may further include a communication circuit 804, a memory 806, a mass storage device 808, an input device 810, and/or a communication link 812 (e.g., a communication bus) over which the one or more components shown in the figure may exchange information.

Communication circuit 804 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 806 may include a storage medium (e.g., a non-transitory storage medium) configured to store machine-readable instructions that, when executed, cause processor 802 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 808 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 802. Input device 810 may include a keyboard, a mouse, a voice-controlled input device, a touch sensitive input device (e.g., a touch screen), and/or the like for receiving user inputs to apparatus 800.

It should be noted that apparatus 800 may operate as a standalone device or may be connected (e.g., networked, or clustered) with other computation devices to perform the functions described herein. And even though only one instance of each component is shown in FIG. 8, a skilled person in the art will understand that apparatus 800 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
at least one processor configured to:
obtain a first sequence of two-dimensional (2D) images associated with a first three-dimensional (3D) image dataset;
receive a 2D annotation of an object of interest associated with a first 2D image of the first sequence of 2D images;
generate a first 3D annotation of the object of interest based at least on the received 2D annotation of the object of interest, wherein the first 3D annotation is generated by automatically annotating, based on the received 2D annotation of the object of interest and a first machine-learned (ML) data annotation model, multiple other 2D images of the first sequence of 2D images, the first ML data annotation model pretrained for extracting respective features associated with the object of interest from the multiple other 2D images based on the received 2D annotation and automatically annotating the multiple other 2D images based on the extracted features;
obtain a second 3D image dataset; and
generate a second 3D annotation of the object of interest based at least on the first 3D annotation of the object of interest, the second 3D image dataset, and a second ML data annotation model, wherein the second ML data annotation model has been pretrained for determining a similarity between the first 3D image dataset and the second 3D image dataset and automatically annotating a second 2D image associated with the second 3D image dataset based on the determined similarity.

2. The apparatus of claim 1, wherein the first sequence of 2D images is obtained along an axis of the first 3D image dataset.

3. The apparatus of claim 1, wherein the 2D annotation of the object of interest is provided by a human annotator, and wherein the at least one processor is further configured to provide a graphical user interface for the human annotator to create the 2D annotation.

4. The apparatus of claim 1, wherein the first 3D annotation of the object of interest is generated further based on a user input that modifies a preliminary version of the first 3D annotation.

5. The apparatus of claim 4, wherein the at least one processor is further configured to adjust parameters of the first ML data annotation model based on the user input.

6. The apparatus of claim 1, wherein the at least one processor being configured to generate the second 3D annotation of the object of interest comprises the at least one processor being configured to:
   obtain a second sequence of 2D images along an axis of the second 3D image dataset;
   identify the second 2D image in the second sequence of 2D images based on the determined similarity between the first 3D image dataset and the second 3D image dataset;
   annotate, automatically, the second 2D image based on the second ML data annotation model and the received 2D annotation of the object of interest; and
   generate the second 3D annotation of the object of interest by automatically annotating multiple other 2D images of the second sequence of 2D images based at least on the automatically annotated second 2D image and the first ML data annotation model.

7. The apparatus of claim 6, wherein the at least one processor is further configured to receive a user input that modifies the automatic annotation of the second 2D image and generate the second 3D annotation of the object of interest further based on the user input.

8. The apparatus of claim 1, wherein the first 3D image dataset includes medical images associated with a first patient and wherein the second 3D image dataset includes medical images associated with a second patient.

9. A method of automatic image annotation, comprising:
   obtaining a first sequence of two-dimensional (2D) images associated with a first three-dimensional (3D) image dataset;
   receiving a 2D annotation of the object of interest associated with a first 2D image in the first sequence of 2D images;
   generating a first 3D annotation of the object of interest based at least on the received 2D annotation of the object of interest, wherein the first 3D annotation is generated by automatically annotating, based on the received 2D annotation of the object of interest and a first machine-learned (ML) data annotation model, multiple other 2D images of the first sequence of 2D images, the first ML data annotation model pre-trained for extracting, based on the received 2D annotation of the object of interest, respective features associated with the object of interest from the multiple other 2D images and automatically annotating the multiple other 2D images based on the extracted features;
   obtaining a second 3D image dataset; and
   generating a second 3D annotation of the object of interest based at least on the first 3D annotation of the object of interest, the second 3D image dataset, and a second ML data annotation model, the second ML data annotation model pre-trained for determining a similarity between the first 3D image dataset and the second 3D image dataset and automatically annotating a second 2D image associated with the second 3D image dataset based on the determined similarity.

10. The method of claim 9, wherein the first sequence of 2D images is obtained along an axis of the first 3D image dataset.

11. The method of claim 9, wherein the 2D annotation of the object of interest is provided by a human annotator, and wherein the method further comprises providing a graphical user interface for the human annotator to create the 2D annotation.

12. The method of claim 9, wherein the first 3D annotation for the object of interest is generated further based on a user input that modifies a preliminary version of the first 3D annotation.

13. The method of claim 12, further comprising adjusting parameters of the first ML data annotation model based on the user input.

14. The method of claim 9, wherein generating the second 3D annotation of the object of interest comprises:
   obtaining a second sequence of 2D images along an axis of the second 3D image dataset;
   identifying the second 2D image in the second sequence of 2D images based on the determined similarity between the first 3D image dataset and the second 3D image dataset;
   annotating, automatically, the second 2D image based on the second ML data annotation model and the received 2D annotation of the object of interest; and
   generating the second 3D annotation for the second 3D image dataset by automatically annotating multiple other 2D images of the second sequence of 2D images based at least on the automatically annotated second 2D image and the first ML data annotation model.

15. The method of claim 9, further comprising receiving a user input that modifies the automatic annotation of the second 2D image, wherein the second 3D annotation of the object of interest is generated further based on the user input.

* * * * *